United States Patent [19]

Thompson et al.

[11] Patent Number: 4,956,497
[45] Date of Patent: Sep. 11, 1990

[54] PHENYLENE ETHER RESIN BASED THERMOPLASTIC COMPOSITIONS

[75] Inventors: Peter H. Thompson; Richard J. Smalling, both of Parkersburg, W. Va.

[73] Assignee: General Electric Company, Selkirk, N.Y.

[21] Appl. No.: 185,013

[22] Filed: Apr. 22, 1988

Related U.S. Application Data

[63] Continuation-in-part of Ser. No. 928,129, Nov. 7, 1986, abandoned.

[51] Int. Cl.$^5$ .................. C08K 5/01; C08L 51/00; C08L 53/00; C08L 72/00
[52] U.S. Cl. .................. 524/474; 524/504; 524/505; 524/508; 524/525; 528/68; 528/92
[58] Field of Search .................. 525/68, 92; 524/525, 524/504, 505, 508, 474

[56] References Cited

U.S. PATENT DOCUMENTS

| | | | |
|---|---|---|---|
| 3,383,435 | 5/1968 | Cizek | 525/132 |
| 4,077,934 | 3/1978 | Lee | 524/508 |
| 4,102,850 | 7/1978 | Cooper et al. | 525/68 |
| 4,128,602 | 12/1978 | Katchman et al. | 525/68 |
| 4,128,603 | 12/1978 | Katchman et al. | 525/68 |
| 4,128,604 | 12/1978 | Katchman et al. | 525/68 |
| 4,145,377 | 3/1979 | Bussink et al. | 524/505 |
| 4,166,055 | 8/1979 | Lee | 524/505 |
| 4,196,116 | 4/1980 | Haaf et al. | 525/68 |
| 4,252,913 | 2/1981 | Katchman et al. | 525/92 |
| 4,373,055 | 2/1983 | Haaf et al. | 525/92 |

*Primary Examiner*—Herbert J. Lilling
*Attorney, Agent, or Firm*—Lowe, Price, LeBlanc, Becker & Shur

[57] ABSTRACT

A thermoplastic composition is provided which comprises a phenylene ether resin, a preformed, two-phase rubber modified, high impact vinyl aromatic resin, and a preformed styrenic homopolymer which has a number average molecular weight of 65,000 to 120,000.

10 Claims, No Drawings

PHENYLENE ETHER RESIN BASED THERMOPLASTIC COMPOSITIONS

This Application is a continuation in part of Ser. No. 06/928,129 filed Nov. 7, 1986, now abandoned.

BACKGROUND OF THE INVENTION

The present invention relates to thermoplastic compositions based on phenylene ether resins. More particularly, the present invention relates to thermoplastic compositions which include a blend or alloy of a phenylene ether resin, a rubber modified, high impact vinyl aromatic resin and a styrenic homopolymer.

Polymer compositions which include polyphenylene ether, high impact polystyrene and homopolystyrene are known in the art. For example, U.S. Pat. No. 3,960,808 to Katchman discloses a composition wherein the homopolystyrene has a number average molecular weight of 30,000 to 60,000. These compositions are disclosed as having an improved surface appearance over other compositions known in the art.

Similarly, compositions of polyphenylene ether resin, high impact polystyrene and homopolystyrene are shown by U.S. Pat. No. 3,819,761 to Lee, Jr. For example, Example 4 of Lee, (Col. 11), discloses a blend of polyphenylene ether, rubber modified polystyrene, and a crystal polystyrene having a number average molecular weight of 129,000.

Phenylene ether resin based compositions are well known in the art and have many uses, such as plumbing fixtures, appliance and business machine housings, as well as various automotive applications. Phenylene ether resins typically have relatively high thermal stabilities, but may suffer from deficiencies in other properties, such as poor resistance to organic solvents, poor melt flow and poor impact resistance. For this reason phenylene ether resins are often blended or alloyed with other resins or materials to give the phenylene ether resin based composition the desired spectrum of properties.

Phenylene ether resins, and phenylene ether copolymers in particular, often have high melt viscosities which limit the size of parts which may be produced and restrict the number of parts which may be molded in a given period of time, sometimes to the point where use of such resins is uneconomical. Consequently, phenylene ether resins are often combined with additional additives, such as triphenyl phosphate, mineral oil, silicon oil and polyolefins, to improve their melt flow characteristics.

As is well known in the art, enhancement of one or more properties of a thermoplastic composition is usually made at the expense of other properties, so that a composition which performs extremely well with respect to one parameter often is inadequate where other parameters are concerned. While such a skewing of performance characteristics may be acceptable for compositions intended for a few highly specialized applications, for most uses it is important that compositions exhibit a balance of various properties, rather than excelling with respect to one at the expense of others.

For example, lowering of the melt viscosity in phenylene ether resins, such as by the additives indicated above, is frequently at the expense of other properties, such as impact strength, tensile strength, and heat resistance. Consequently, a phenylene ether resin based thermoplastic composition which has good impact and tensile strength while exhibiting a lower melt viscosity offers significant practical advantages over other phenylene ether resin based thermoplastic compositions known in the art.

SUMMARY OF THE INVENTION

The present invention is a thermoplastic composition which includes a phenylene ether resin, a preformed, two-phase rubber modified, high impact vinyl aromatic resin, and a preformed styrenic homopolymer, the improvement comprising the styrenic homopolymer being one which has a number average molecular weight of 65,000 to 120,000. Preferably, the styrenic homopolymer has a number average molecular weight of about 68,000 to about 100,000, and more preferably about 68,000 to about 85,000. Blends of a polyphenylene ether resin, a high impact polystyrene and a homopolystyrene are most preferred.

DETAILED DESCRIPTION OF THE INVENTION

The present invention is a thermoplastic composition which includes a phenylene ether resin, a preformed, two-phase rubber modified, high impact vinyl aromatic resin and a preformed styrenic homopolymer, wherein the styrenic homopolymer is selected to be one which has a number average molecular weight of 65,000 to 120,000.

The phenylene ether resin useful in the composition of the present invention in general is a polymer of a 2,6-dialkyl phenol, such as 2,6-dimethyl phenol, and copolymers thereof with a 2,3,6-trialkyl phenol, such as 2,3,6-trimethyl phenol. When the phenylene ether polymer is a copolymer, as opposed to a homopolymer, the proportion of 2,3,6-trialkyl phenol will usually be about 2 to about 50% by weight, based on the total weight of the phenylene ether copolymer. However, the preferred copolymers are those comprising about 2 to about 20 wt%, and more preferably about 2 to about 10 wt% 2,3,6-trialkyl phenol and, correspondingly, from about 98 to about 80 wt% and more preferably about 98 to about 90 wt% 2,6-dialkyl phenol.

The synthesis of such phenylene ether resins from the corresponding phenols by an oxidative coupling process is well known in the art, and is exemplified in U.S. Pat. No. 4,011,200. Although the phenylene ether resin useful in the composition of the present invention may be a phenylene ether homopolymer, phenylene ether copolymers are preferred.

The present invention also includes a preformed high impact vinyl aromatic resin; that is, the impact vinyl aromatic resin is formed before it is combined with the phenylene ether resin and the styrenic homopolyer. This high impact styrenic resin is one derived from one or more vinyl aromatic monomers, such as styrene, alpha-methyl-styrene, bromostyrene, chlorostyrene, dibromostyrene and vinyl toluene, and modifications and equivalent monomers thereof. Mixtures of different vinyl aromatic monomers may be used, such as in high impact styrenic resins of styrene and alpha-methyl styrene. Resins wherein the vinyl aromatic monomer is principally styrene are preferred, with other vinyl aromatic monomers being present, if at all, in such small quantities that they do not significantly affect the physical or chemical properties of the resin, so that the high impact resin is a high impact polystyrene.

The vinyl aromatic monomer or mixture of monomers form a rigid phase which is combined with an elastomeric material to form a two-phase system wherein the "rubber" or elastomer is dispersed in the form of discrete particles in a polyvinyl aromatic or "styrenic" resin matrix.

Such interpolymers are made by graft polymerizing at least some of the vinyl aromatic monomer in the presence of the rubber so that at least some of the vinyl aromatic monomer becomes grafted to the rubber substrate. This process typically results in the polymerized vinyl aromatic monomer forming a continuous phase in which the rubber or elastomer is dispersed in a discontinuous, elastomeric gel phase, with grafted chains of polymerized vinyl aromatic monomer. Such rubber particles may also contain occluded, polymerized vinyl aromatic monomer as well. Methods for forming such high impact styrenic resins are well known in the art.

The "rubber" or elastomeric phase of the high impact styrenic resin is usually a natural or synthetic rubber, such as polybutadiene, polyisoprene, rubbery copolymers of dienes with other copolymers, such as styrene, acrylonitrile, acrylic esters, and the like, including block copolymers of the A-B-A and A-B type, wherein A is a vinyl aromatic, such as styrene, and B is a diene, such as butadiene, as well as EPDM rubbers, EPM rubbers, EPR rubbers and the like. Butadiene-based rubbers are preferred.

The high impact styrenic resin usually includes about 5 to about 10 wt% rubber, based on the total weight of the high impact styrenic resin. However, grades for specialized applications may include as much as 25 wt% or more rubber consistent with the present invention.

The styrenic homopolymer is a polymer formed by the polymerization of styrene monomer prior to combination of the homopolymer with the phenylene ether resin and the high impact vinyl aromatic resin. Other vinyl aromatic monomers, such as alpha-methyl styrene, bromostyrene, chlorostyrene, dibromostyrene and vinyl toluene, as well as the equivalents thereof may also be present in minor amounts, such as in polymers formed by the copolymerization of styrene and alpha-methyl styrene or styrene and dibromostyrene. It is preferred, however, that when other vinyl aromatic monomers are employed, that they be present in amounts less than 10 wt%, and more preferably less than 5 wt% of the styrenic homopolymer. However, it is most preferred that the only vinyl aromatic monomer be styrene, so that the styrenic homopolymer is a homopolystyrene. Blends of different styrenic homopolymers may also be used.

It is critical to the invention that the styrenic homopolymer be one having a number average molecular weight of 65,000 to 120,000. Preferably, the styrenic homopolymer is one having a number average molecular weight of about 68,000 or more, and more preferably about 100,000 or less, with styrenic homopolymers of a number average molecular weight of about 68,000 to about 85,000 being most preferred. Suitable styrenic homopolymers are available commercially or may be prepared by means well known in the art.

In the preferred embodiment the thermoplastic composition includes about 10 to about 90 parts by weight phenylene ether resin, about 85 to about 5 parts by weight high impact vinyl aromatic resin, and about 5 to about 85 parts by weight styrenic homopolymer, based on a total of 100 parts by weight of phenylene ether resin, high impact vinyl aromatic resin and styrenic homopolymer in the thermoplastic composition. More preferably, the composition includes about 20 to about 80 parts by weight phenylene ether resin, about 15 to about 75 parts by weight high impact vinyl aromatic resin and about 5 to about 50 parts by weight styrenic homopolymer, for a total of 100 parts by weight of phenylene ether resin, high impact vinyl aromatic resin, plus styrenic homopolymers.

The thermoplastic composition of the invention may additionally include other resins such as polyolefins and polyamides as well as additives such as lubricants, antioxdants, flame retardants, stabilizers, and impact modifiers. A mineral oil may also be included. When included the mineral oil preferably is present in an amount equal to 0.1 to about 5 parts by weight, based on 100 parts by weight phenylene ether resin, high impact vinyl aromatic resin, plus styrenic homopolymer.

Although various proportions of these and other additives may be included, in its most preferred embodiment the polymer component of the composition of the present invention consists essentially of a phenylene ether, polystyrene having about 5 to about 10 wt % rubber, and a homopolystyrene having a number average molecular weight of about 68,000 to about 85,000.

The present invention may be further understood by reference to the following, illustrative examples.

SPECIFIC EMBODIMENTS

A computer model, previously experienced by the applicants as accurately predicting physical properties for polyphenylene ether resin based formulations, was employed to predict the izod impact strength, the heat distortion temperature (HDT), melt viscosity and tensile strength of a number of different thermoplastic compositions, as if they had been tested according to ASTM standards D 256 Method A, D 648, D 3835 and D 638, respectively. The results of prediction by this computer model are shown below in Tables I and II.

In Tables I and II PPE indicates a polyphenylene ether resin derived from 5 wt% 2,3,6-trimethyl phenol and 95 wt% 2,6-dimethyl phenol. HIPS-8 indicates a high impact styrene resin which includes 8 parts by weight butadiene. A-B-A indicates a styrene-butadiene-styrene block copolymer rubber. EPM indicates an ethylene propylene rubber. HIPS-10 indicates a high impact styrene resin which contains 10 parts by weight butadiene. XPS-118 indicates a polystyrene of a molecular weight of 290,000 and a number average molecular weight (Mn) of 118,000. XPS-68 indicates a polystyrene with a molecular weight of 200,000 and 68,000 Mn. Unlike XPS-118, however, XPS-68 also includes 3 parts of mineral oil.

In Tables I and II below, Examples 1, 4, 7, 10, 12 and 15 represent various embodiments of the present invention. Examples 2, 3, 5, 6, 8, 9, 11, 13, 14, 16 and 17 in Tables I and II below represent compositions which do not embodiment the invention, but are provided for the purposes of comparison.

In addition, a composition consistent with one embodiment of the invention (Example 18) was compared in actual testing to several known thermoplastic compositions. These compositions are Cycolac® Z48, an ABS thermoplastic available from Borg-Warner Chemicals, Inc., Prevex® W30, a polyphenylene ether copolymer composition available from Borg-Warner Chemicals, Inc., Noryl® PX0844, a polyphenylene ether homopolymer composition available from the General Electric the General Electric Corporation, and Ube Cycon Y600D, an ABS thermoplastic, available from Ube Cycon Corporation in Japan. The composition of Example 18, which is consistent with one embodiment of the invention, is a 34/40/26 parts by weight blend of a polyphenylene ether copolymer of 5 parts 2,3,6-trimethyl phenol and 95 parts 2,6-dimethyl phenol, a high impact styrene resin having 10 parts butadiene, and a polystyrene of 68,000 Mn and 200,000 molecular weight. These tests were performed according to the following ASTM standards:

| Property | Abbreviation | ASTM Standard |
|---|---|---|
| Tensile Strength | (TS) | D 638 |
| Tensile Modulus | (TM) | D 638 |
| Flexural Strength | (FS) | D 790 |
| Flexural Modulus | (FM) | D 790 |
| Heat Distortion Temperature | (HDT) | D 648 |
| Izod Impact | (II) | D 256 Method A |
| Mold Shrinkage | (MS) | D 955 |
| Coefficient of Linear Thermal Expansion | (CLTE) | D 696 |
| Melt Viscosity | (MV) | D 3835 |
| Glass Transition Temperature | (GTT) | D 3418 |

The results of these tests are indicated below in Table III.

Several compositions including a phenylene ether resin, a preformed, high impact polystyrene and (except for Example 18) a preformed styrenic homopolymer of various number average molecular weights were tested. The compositions and results of testing are indicated below in Tables IV and V, respectively. In addition to the components indicated below in Table IV each composition contained the same standard additives. The styrenic homopolymers were homopolystyrenes of the following characteristics:

| Polystyrene | Molecular Weight | No. Avg. Mol. Wt. |
|---|---|---|
| PS-81A | 208,000 | 81,000 |
| PS-81B | 262,000 | 81,000 |
| PS-130 | 284,000 | 130,000 |
| PS-36 | 97,000 | 36,000 |
| PS-95 | 262,000 | 95,000 |
| PS-252 | 974,000 | 252,000 |

All samples were compounded without pigments. The compositions for both Examples 23 and 28 were difficult to compound due to their high viscosity and tendency to surge through the die. All samples were molded under the following molding conditions:

| Temperature - °F.: | |
|---|---|
| Front Zone | 515 |
| Center Zone | 525 |
| Back Zone | 525 |
| Mold Core | 160 |
| Mold Cavity | 160 |

All samples were molded using the same position transfer and back pressure. The hold pressure for Examples 24, 25 and 29 was 60 psi, for Examples 18–22 and 28 the hold pressure was 80 psi, and for Example 23 the hold pressure was 120 psi. Samples were molded at a ram speed of 0.6 in/sec; a screw RPM of 65; an amount of fill of 1.8 in.; a cushion of 0.125 in.; and injection time of 15 sec.; and a hold time of 15 seconds. Examples 19, 21, 24, 26 and 29 represent various embodiments of the invention. The remaining examples are provided for the purposes of comparison.

It will be understood that various changes and modifications may be made in the embodiments outlined above without departing from the spirit of the invention, which includes all equivalents and modifications thereof, and is limited only by the following claims.

TABLE I

| EXAMPLE | 2 | 3 | 4 | 5 | 6 | 7 | 8 | 9 |
|---|---|---|---|---|---|---|---|---|
| PPE | 34 | 35 | 35 | 34 | 35 | 36 | 34 | 35 | 36.5 |
| HIPS-8 | | 64.4 | 65 | | 62.6 | 64 | | 59.9 | 63.5 |
| A-B-A | | 0.5 | | | 1.9 | | | 4 | |
| EPM | | 0.1 | | | 0.5 | | | 1.1 | |
| HIPS-10 | 20 | | | 30 | | | 40 | | |
| XPS-118 | 46 | | | 36 | | | 26 | | |
| Izod Impact | 2.0 | 2.0 | 1.8 | 2.6 | 2.6 | 1.8 | 3.4 | 3.4 | 1.8 |
| HDT | 225 | 225 | 225 | 227 | 227 | 227 | 228 | 228 | 228 |
| Melt Viscosity | 3199 | 4095 | 4046 | 3449 | 4246 | 4172 | 3510 | 4483 | 4236 |
| Tensile Strength | 9100 | 7552 | 7617 | 8500 | 7359 | 7701 | 7900 | 7069 | 7743 |

TABLE II

| Example | 10 | 11 | 12 | 13 | 14 | 15 | 16 | 17 |
|---|---|---|---|---|---|---|---|---|
| PPE | 34 | 32 | 34 | 31 | 31 | 34 | 29 | 30.5 |
| HIPS-8 | | 68 | | 68.1 | 69 | | 67.4 | 69.5 |
| A-B-A | | | | 0.7 | | | 2.8 | |
| EPM | | | | 0.2 | | | 0.8 | |
| HIPS-10 | 20 | | 30 | | | 40 | | |
| XPS-68 | 46 | | 36 | | | 26 | | |
| Izod Impact | 1.6 | 1.9 | 2.2 | 2.0 | 1.9 | 3.1 | 3.1 | 1.9 |
| HDT | 220 | 220 | 218 | 218 | 218 | 217 | 217 | 217 |
| Melt Viscosity | 2687 | 3691 | 2737 | 3645 | 3580 | 2756 | 3620 | 3525 |
| Tensile Strength | 8220 | 7346 | 7865 | 7183 | 7280 | 6535 | 6725 | 7238 |

TABLE III

| Composition Property | Cycolac ® Z48 | Prevex ® W30 | Noryl PX0844 | Ube Cycon Y600D | Ex. 18 |
|---|---|---|---|---|---|
| TS, psi | 6655 | 6485 | 6343 | 6320 | 6535 |
| TM, 10E5 psi | 3.65 | 3.49 | 3.40 | 3.62 | 3.69 |
| FS, psi | 11435 | 11465 | 11830 | 10945 | 13455 |
| FM, 10E5 psi | 3.5 | 3.3 | 3.5 | 3.7 | 4.1 |
| HDT, | | | | | |
| ½ × ¼" CMU | — | 241 | — | 236 | 236 |
| ½ × ¼" IMU | 222 | 233 | — | 229 | 229 |
| ½ × ⅛" IMU | 205 | 224 | 227 | 213 | 217 |
| II, at 73° F. | 3.7 | 4.9 | 5.0 | 2.3 | 3.1 |
| MS, in/in | .0076 | .0075 | .0075 | .0064 | .0060 |
| CLTE | 8.4 | 8.0 | 8.0 | 6.9 | 6.9 |
| MV, at 550° F. | | | | | |
| 100s-1 | 7429 | 9604 | 11080 | 5473 | 5496 |
| 500s-1 | 3068 | 3906 | 4089 | 2537 | 2756 |
| 1000s-1 | 2096 | 2651 | 2667 | 1822 | 2048 |
| GTT, °C. | 117 | 132 | 129 | 130 | 131 |

TABLE IV

| EXAMPLE | 18 | 19 | 20 | 21 | 22 | 23 | 24 | 25 | 26 | 27 | 29 | 29 |
|---|---|---|---|---|---|---|---|---|---|---|---|---|
| PPE | 34 | 33 | 33 | 33 | 33 | 33 | 26 | 26 | 26 | 26 | 26 | 26 |
| HIPS-8 | 63 | — | — | — | — | — | — | — | — | — | — | — |
| HIPS-10 | — | 36 | 36 | 36 | 36 | 36 | 36 | 36 | 36 | 36 | 36 | 36 |
| PS-81A | — | 26 | — | — | — | — | 35 | — | — | — | — | — |
| PS-130 | — | — | — | — | 26 | — | — | — | — | 35 | — | — |
| PS-81B | — | — | — | — | — | — | — | — | — | — | — | 35 |
| PS-36 | — | — | 26 | — | — | — | — | 35 | — | — | — | — |
| PS-95 | — | — | — | 26 | — | — | — | — | 35 | — | — | — |

TABLE IV-continued

| EXAMPLE | 18 | 19 | 20 | 21 | 22 | 23 | 24 | 25 | 26 | 27 | 29 | 29 |
|---|---|---|---|---|---|---|---|---|---|---|---|---|
| PS-252 | — | — | — | — | — | 26 | — | — | — | — | 35 | — |
| ABA | 3 | 5 | 5 | 5 | 5 | 5 | 3 | 3 | 3 | 3 | 3 | 3 |

TABLE V

| EXAMPLE PROPERTY | 18 | 19 | 20 | 21 | 22 | 23 | 24 | 25 | 26 | 27 | 28 | 29 |
|---|---|---|---|---|---|---|---|---|---|---|---|---|
| TS, psi | 8045 | 7580 | 7505 | 7665 | 7720 | 7835 | 7315 | 6830 | 7140 | 7185 | 7655 | 7160 |
| TM, 10E5 psi | 3.07 | 3.44 | 3.34 | 3.37 | 3.09 | 3.42 | 3.42 | 3.45 | 3.16 | 3.32 | 3.30 | 3.36 |
| TE, | 34 | 45 | 46 | 41 | 41 | 45 | 47 | 47 | 55 | 52 | 42 | 58 |
| 11 @ 73° F. | 3.9 | 4.8 | 4.3 | 4.8 | 5.0 | 4.2 | 2.9 | 2.2 | 3.0 | 3.0 | 4.1 | 2.8 |
| HDT, ¼ × ¼" IMU | 219 | 223 | 220 | 222 | 222 | 220 | 210 | 208 | 210 | 212 | 210 | 213 |
| MV, @ 550° F. | | | | | | | | | | | | |
| 100s-1 | 6404 | 6548 | 4878 | 6579 | 6487 | 8219 | 4527 | 3320 | 5331 | 5548 | 7312 | 4857 |
| 500s-1 | 3042 | 2955 | 2428 | 2967 | 2936 | 3535 | 2113 | 1706 | 2405 | 2484 | 3027 | 2235 |
| 1000s-1 | 2098 | 2017 | 1728 | 2019 | 2018 | 2426 | 1510 | 1220 | 1638 | 1692 | 2047 | 1537 |
| GTT, °C. | 137 | 133 | 130 | 132 | 131 | 132 | 122 | 120 | 123 | 121 | 122 | 120 |

We claim

1. A thermoplastic polymer composition comprising:
   (a) a phenylene ether resin;
   (b) a preformed, two-phase high impact vinyl aromatic resin which includes a vinyl aromatic monomer and a rubber, at least some of said vinyl aromatic monomer being graft polymerized with said rubber; and
   (c) a preformed styrenic homopolymer having a number average molecular weight of about 65,000 to 120,000.

2. The composition of claim 1 wherein the styrenic homopolymer is homopolystyrene.

3. The thermoplastic composition of claim 1 wherein said styrenic homopolymer has a number average molecular weight of about 68,000 to about 100,000.

4. The composition of claim 3 wherein said styrenic homopolymer has a number average molecular weight of about 68,000 to about 85,000.

5. The thermoplastic composition of claim 2 wherein said rubber modified, high impact vinyl aromatic resin is a high impact polystyrene.

6. The composition of claim 1 wherein said composition includes;
   (a) about 10 to about 90 parts by weight phenylene ether resin;
   (b) about 85 to about 5 parts by weight rubber modified, high impact vinyl aromatic resin; and
   (c) about 5 to about 85 parts by weight styrenic homopolymer;
   based on a total of 100 parts by weight in said thermoplastic composition.

7. The composition of claim 6 wherein said composition includes;
   (a) about 20 to about 80 parts by weight phenylene ether resin;
   (b) about 15 to about 75 parts by weight rubber modified, high impact styrenic resin; and
   (c) about 5 to about 50 parts by weight styrenic homopolymer;
   based on a total of 100 parts by weight in said thermoplastic composition.

8. The composition of claim 6 wherein said thermoplastic composition additionally includes a mineral oil.

9. The composition of claim 1 wherein said high impact vinyl aromatic resin is one which contains about 5 to about 10 wt % rubber.

10. A thermoplastic polymer composition wherein the polymer component consists essentially of:
   (a) a phenylene ether resin;
   (b) a preformed, two-phase high impact polystyrene containing about 5 to about 10 wt % rubber having at least some styrene graft polymerized to said rubber; and
   (c) a preformed, homopolystyrene, said homopolystyrene having a number average molecular weight of about 68,000 to about 85,000.

* * * * *